INVENTOR.
WARREN O. ESSLER
BY Moody and Goldman
ATTORNEYS

Jan. 20, 1959 W. O. ESSLER 2,870,346

PULSE STRETCHING PHASE DETECTOR

Filed June 11, 1956 3 Sheets-Sheet 2

INVENTOR.
WARREN O. ESSLER
BY Moody and Goldman
ATTORNEYS

INVENTOR.
WARREN O. ESSLER
BY Moody and Goldman
ATTORNEYS

United States Patent Office 2,870,346

Patented Jan. 20, 1959

2,870,346

PULSE STRETCHING PHASE DETECTOR

Warren Orvel Essler, Brookings, S. Dak., assignor to Collins Radio Company, Cedar Rapids, Iowa, a corporation of Iowa Application June 11, 1956, Serial No. 590,675

2 Claims. (Cl. 307—88.5)

Figure 1:
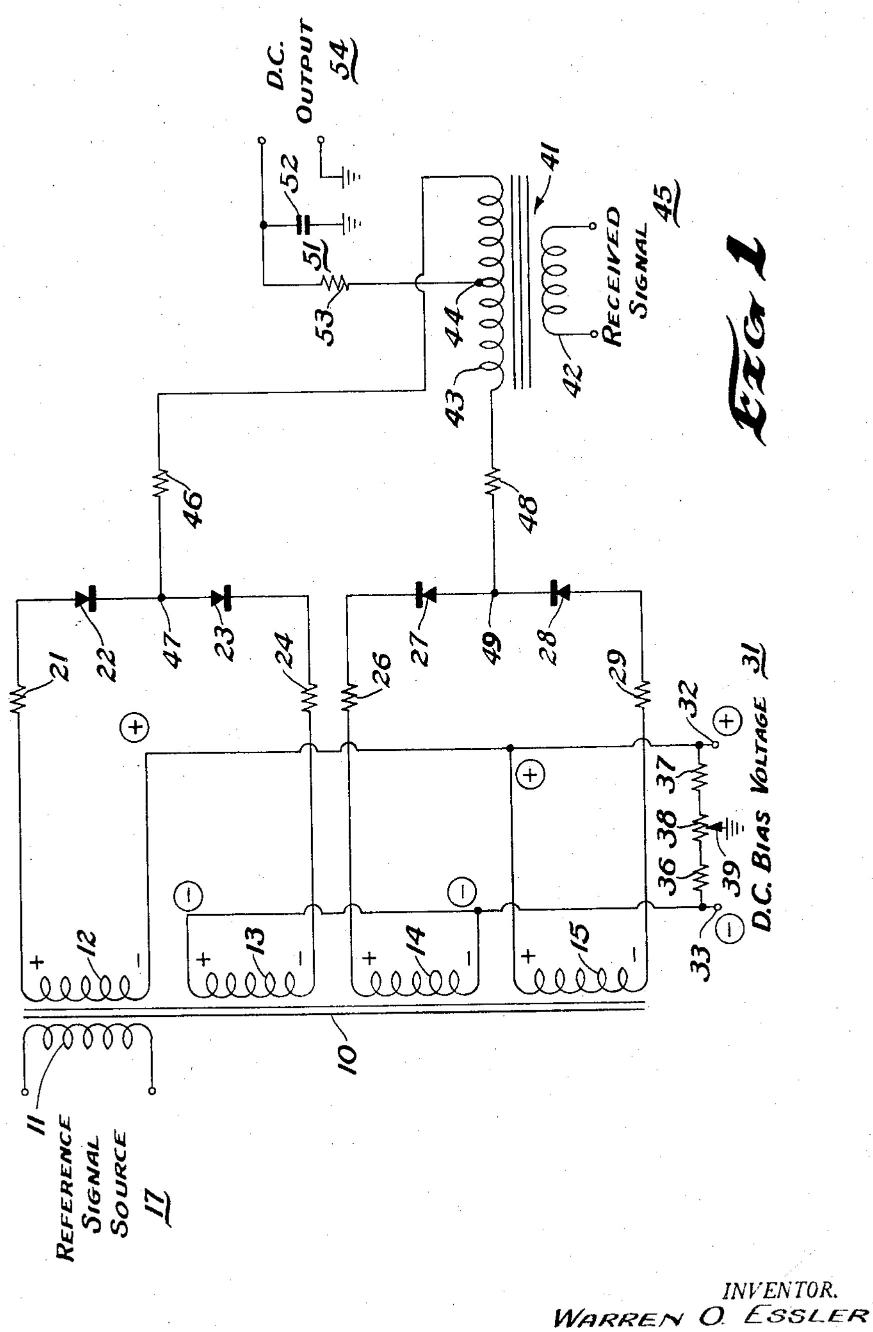

This invention relates particularly to a phase detector which is capable of maintaining a very high output impedance while it is not receiving a particular input signal.

Very often, the output of a phase detector provides an error voltage for a servo system. Servo systems generally operate best with error voltages which do not have transient components. A high output impedance for a phase detector enables filtering of transient components by a direct connection of an integration circuit (or low-pass filter) to the detector's output. In some cases it is necessary for one or both of the input signals for a phase detector to be gated; that is, the signal occurs in bursts with large pauses between the bursts. Conventional ring modulators do not maintain high output impedances during periods between bursts of one or both of its signals. As a result, the conventional ring modulator provides a pulsed output. Its output cannot be smoothed between gated pulses by an integrating circuit because the low output impedance occurring between bursts of input signal, in effect, short-circuits an integrating network connected to its output.

Thus, a gated input to the conventional ring-modulator phase detector causes a pulsed D. C. output, wherein the pulses are provided during the instances that the gated bursts of input signal are being received. A pulsed D. C. output will have transients, which are undesirable when the D. C. output is the error voltage for a servo system, since transients can cause erratic behavior by a servo system.

The high output impedance obtainable with the invention both during and between bursts of input signal avoids an effectual short-circuit across an integrating circuit connected to the output of the invention. The integrating circuit, or low-pass filter, then is not short-circuited between bursts of input signal and maintains a D. C. voltage output between gated input pulses that, in effect, stretches the output pulses over the period between pulses. Thus, the invention can provide a substantially smoothly-varying D. C. error voltage for a servo system without substantial transient components caused by the gating of either one or both input signals.

It is, therefore, an object of this invention to provide a phase detector with a high output impedance during periods when no input signal is received.

It is another object of this invention to provide a phase detector that enables an integration circuit to stretch output pulses to obtain a substantially smooth output from an integration circuit when both of its input signals are gated.

The invention uses a pair of transformers, which are a reference-voltage transformer and a signal transformer. The reference-voltage transformer includes a primary winding that receives a first input signal and also includes four secondary windings that are capable of providing substantially equal output voltages. A first pair of diodes serially connect between opposite A. C. polarity ends of the first and second secondary windings, and a second pair of diodes serially connect between opposite A. C. polarity ends of the third and fourth secondary windings. With respect to the instantaneous A. C. polarities at the ends of the secondary windings, the first pair of diodes connect with opposite series polarity from the second pair of diodes.

The invention provides a D. C. bias voltage which is preferably balanced with respect to ground. The bias voltage is applied between the remaining ends of the first and second secondary windings and also is applied between the remaining ends of the third and fourth secondary windings. In each case, the D. C. biasing voltage is connected to normally bias below cutoff both pairs of diodes.

The signal transformer includes a primary winding and a secondary winding that has a center tap. The primary of the signal transformer is connected to the second input signal, which is to be phased compared with the first signal. One end of the secondary is connected serially to a point between the first pair of diodes; and the other end of the secondary is connected serially to a point between the second pair of diodes.

The high-impedance output of the invention is taken between ground and the center-tap of the signal transformer's secondary winding.

An integrating circuit (low-pass filter) may be connected to the output.

Further objects, features, and advantages of the invention will be apparent to a person skilled in the art upon further study of the specification and drawings, in which Figure 1 is an illustrative embodiment of the invention;

Figures 2, 3, 4, and 5 show waveforms illustrating phase-detector input-output relationships;

Figures 6, 7, 8, and 9 show waveforms used in explaining the operation of the invention.

Now referring to the invention in more detail, Figure 1 provides an illustrative embodiment which has a reference voltage transformer 10 that includes a primary 11 and four secondaries 12, 13, 14, and 15. Primary 11 is connected to a source 17 of reference signal source that provides one input signal.

For clarity in explanation, the secondaries are assumed to be wound to provide the A. C. polarities indicated by the non-circled plus and minus signs at the ends of the respective windings.

A resistor 21, a pair of diodes 22 and 23, and another resistor 24 are respectively connected in series between the positive A. C. polarity end of first secondary 12 and the negative A. C. polarity end of second secondary 13. Resistors 21 and 24 are substantially equal in resistance value, and diodes 22 and 23 are matched to have substantially identical conduction characteristics. Diodes 23 and 22 are connected with like-series polarity to be non-conducting with the indicated instantaneous A. C. polarity.

In a similar manner, a resistor 26, a pair of diodes 27 and 28, and another resistor 29 are connected in series between the positive A. C. polarity end of third secondary 14 and the negative A. C. polarity end of fourth secondary 15. Also, resistors 26 and 29 are substantially equal in value and are preferably equal to first mentioned resistors 21 and 24. The second pair of diodes 27 and 28 also have substantially matched characteristics; and they are connected with like-series polarity to be conducting with the indicated A. C. instantaneous polarity.

A balanced D. C. bias-voltage source 31 is provided. The plus and minus polarity signs for source 31 are indicated in Figure 1 with circles about them to distinguish them from the instantaneous A. C. polarities indicated at the ends of the transformer windings. Source 31 has its positive terminal 32 connected to the negative A. C. polarity end of first secondary 12 and to the positive A. C.

polarity end of fourth secondary 15. The negative bias terminal 33 is connected to the positive A. C. polarity end of second secondary 13, and to the negative A. C. polarity end of third secondary 14.

A pair of resistors 36 and 37 and an intermediate potentiometer 38 are connected serially between opposite D. C. terminals 32 and 33. The adjustable tap 39 of potentiometer 38 is connected to ground and is used to adjust the D. C. bias-voltage balance and also provides an adjustable center-tap between the first and second secondaries 12 and 13 and between the third and fourth secondaries 14 and 15.

A signal transformer 41 has a primary 42 and a secondary 43 with a center tap 44. Primary 42 is connected to a received signal source 45 which provides the second input which is to be phase compared to reference signal 17. Received signal 45 may be gated.

One end of secondary 43 is serially connected through a resistor 46 to a point 47 which is between the first pair of diodes 22 and 23. The opposite end of secondary 43 is connected through another resistor 48 to another point 49 which is between the second pair of diodes 27 and 28. Resistors 46 and 48 are preferably equal in resistance value.

An integrating circuit 51 is connected to the output of the phase comparator between ground and center tap 44. The integrating circuit (low-pass filter) includes a capacitor 52 and a resistor 53 connected between ground and center tap 44 of secondary 43. A D. C. output 54 of the illustrated invention in Figure 1 is taken across capacitor 52.

Figures 2, 3:
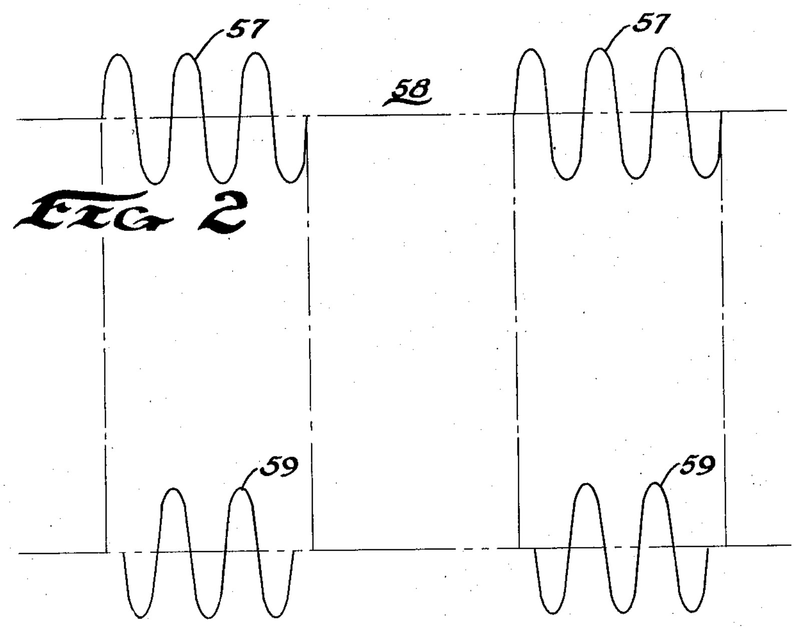

Figure 2 illustrates a gated input signal of a type which may be applied to primary 42 of signal transformer 41. Each burst 57 of gated signal might, for example, consist of several cycles of 100 cycle-per-second oscillation with a pause 58 of no signal between bursts 57 of oscillation. Each pause 58 may exist for several times the duration of each signal burst.

Figure 3 illustrates a gated reference signal 59 of the same frequency which may be obtained from a local oscillator. Its gated bursts each start after the start of a comparable burst of received signal 58 and end before the end of the comparable burst of signal 58.

The phase detector of Figure 1 does not provide any D. C. output component when a 90-degree phase relationship exists between the reference input signal 59 and received input signal 57. When the phase between them deviates from 90 degrees, a D. C. output component will be provided from the invention, and the D. C. output will have positive polarity when the phase deviates in one direction, and will have negative polarity when the phase deviates in the opposite direction.

Figure 4:
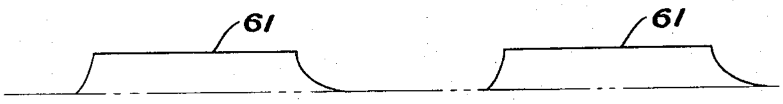

The conventional ring-modulator type of phase detector provides a pulsed D. C. output component 61, such as shown in Figure 4, from an integrator circuit connected to its output, because its low output impedance acts as a virtual short-circuit across any low-pass filter connected to its output, and therefore any D. C. output quickly drops to zero when a burst 57 terminates. Consequently, pulses are formed, and transient effects are caused by the leading and trailing edges of the output pulses. Such transient effects are undesirable, for example, when the output provides an error voltage for a servo system.

Figure 5:
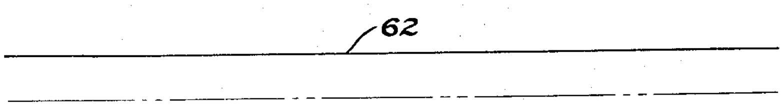

Figure 5 illustrates a smooth output 62 obtained from an integrator circuit connected to the output of the present invention, when it phase compares gated signal 57 of Figure 2 with gated signal 59 of Figure 3. There is no discontinuity in the output of the invention between bursts of the signals. This results from the high output impedance provided by the invention between bursts, which will not cause any short-circuit between bursts across its low-pass filter (integrating circuit 52).

Figures 6, 7, 8, 9:
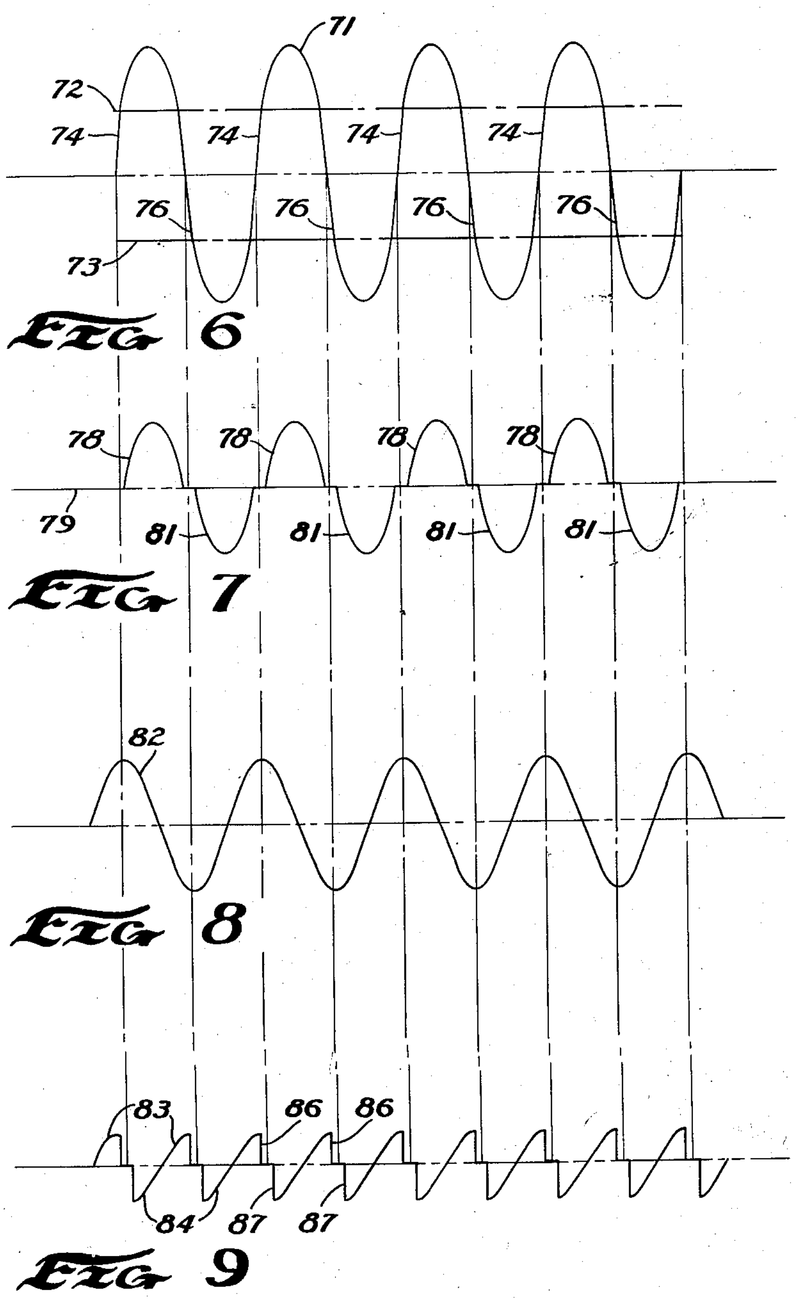

Figure 6 illustrates voltage waves 71 induced in each of the secondaries of transformer 10 by reference input signal 17. Hence, wave 71 is induced in first and second primaries 12 and 13 and is applied to its diodes 22 and 23; and wave 71 is also induced in third and fourth primaries 14 and 15 and is applied to the second pair of diodes 27 and 28.

The D. C. bias voltage 31 provided to the diodes maintains them slightly below cutoff when no reference signal is provided. The connections of bias source 31 to first and second secondaries 12 and 13 have an apparent reversal with respect to third and fourth secondaries 14 and 15 due to the reversal of series polarity by the series-connected diodes. Accordingly, the bias on all of the diodes tends to maintain them in a nonconducting state.

Upper broken line 72 in Figure 6 illustrates the level of positive bias applied to the diodes, and lower broken line 73 illustrates the level of negative bias applied to the diodes. The magnitudes of the positive and negative D. C. polarities are preferably equal.

Current will flow through the diodes by action of reference input voltage 17 only when the induced reference voltage 59 in the secondaries exceeds the bias levels 72 and 73 of the diodes. Hence, conduction occurs in the first pair of diodes 22 and 23 when the positive one-half cycle 74 in Figure 6 exceed bias level 72. In a similar manner, negative half cycles 76 in Figure 6 of induced voltage 71 cause conduction in the second pair of diodes 27 and 28 only when they exceed the lower bias level 73 in Figure 6.

As a result, the currents through the diodes will have a discontinuous form which is illustrated in Figure 7. The current loops 78 above reference line 79 occur through the first pair of diodes 22 and 23, and the current loops 81 below reference line 79 occur through the second pair of diodes 27 and 28.

Due to the matched characteristics of the diodes and due to the equal values of their respective series resistors 21, 24, 26, and 29, ground potential exists at all times at points 47 and 49 during the application of reference signal 17 which acts as a switching voltage that opens or closes the impedances provided by the diodes between ground and the respective points 47 and 49.

Figure 8 illustrates a received input signal 82 of the same type as wave 59 in Figure 3, which is 90 degrees out of phase with reference input signal 71 shown in Figure 6 and therefore with the reference current shown in Figure 7. The reference signal preferably has a much larger amplitude than the received signal.

The current waveform shown in Figure 9 represents the output of the phase detector provided at center tap 44 of signal transformer 41. Integrator circuit 52 removes the A. C. components of the output signal and passes only the D. C. components. The waveform of Figure 9 does not include any D. C. component, since the compared voltages are 90 degrees in phase, which provide positive and negative current loops 83 and 84 in Figure 9 having equal areas.

When the compared signals have a phase other than 90 degrees, the positive or the negative current loops of the waveform will have different areas and hence will provide a D. C. component with a polarity that represents the difference in areas between positive and negative loops 83 and 84.

It is noted that the switching in the waveform of Figure 9, indicated by the broken vertical lines 86 and 87, is not aligned as will occur with a conventional ring-modulator type of phase detector. The offset in the vertical characteristic in Figure 9 is caused by the bias on the diodes. The offset will be slight when the bias is small and will increase as the bias increases. The relative amount of bias in Figure 6 is exaggerated for explanation purposes.

As a result, the variation of D. C. output from integrator 52 will vary somewhat differently from the conventional type of ring-modulator phase detector. Generally, it will be preferable to maintain the diode bias in the invention as small as is compatible with sufficient cutoff bias to maintain a high back impedance for the diodes.

When the reference-signal input 71 is large in amplitude compared to the received signal, a substantial D. C. bias on the diodes is permissible, and the bias will intersect the nearly vertical portions of the voltage wave in Figure 6. Accordingly, the breaks in the current wave shown in Figure 7 can thus be maintained with an extremely short duration in comparison to a one-half cycle; and as a result, the breaks in the vertical switching characteristic in Figure 9 are made negligible.

Also, the induced voltages 71 in the secondaries should be greater than the received signal 82 in order that the received signal will not act as a bias that will control the conduction state of the diodes, which should be solely a function of the reference input voltage source 17.

While particular forms of the invention have been shown and described, it is to be understood that the invention is capable of many modifications. Changes, therefore, in construction and arrangement may be made without departing from the scope of the invention as given by the appended claims.

What is claimed is:

1. A phase comparator that has a high output impedance when no input signals are received, comprising a reference voltage transformer, and a signal transformer, said reference voltage transformer having a primary, and first, second, third, and fourth substantially identical secondaries, each secondary having a positive end and a negative end induced at one instant, a first pair of equal-valued resistors with one having an end connected to the positive end of the first secondary and the other having an end connected to the negative end of the second secondary, a pair of diodes connected in series with the same polarity between the other ends of said first pair of resistors, a second pair of equal-valued resistors with one having an end connected to the positive end of the third secondary and the other having an end connected to the negative end of the fourth secondary, a second pair of diodes connected in series with the same polarity between the other ends of said second pair of resistors, with said second pair of diodes connected oppositely from said first pair of diodes with respect to the instantaneous polarities of said secondaries, a direct-current biasing source with a positive potential side and a negative potential side, said negative side being connected to said positive end of said second secondary and said negative end of said third secondary, and said positive side being connected to said negative end of the first secondary and said positive end of the fourth secondary, so that said diodes are normally biased below cutoff, said signal transformer having a center-tapped secondary, another resistor connected at one end to a point between said first pair of diodes and connected at its other end to one side of said center-tapped secondary, a further resistor connected at one end to the opposite side of said center-tapped secondary and connected at its other end to a point between said second pair of diodes, and an integrating circuit connected serially to the center tap to provide the output of said phase comparator.

2. A phase comparator that has a high output impedance when no input signals are received, comprising a reference-voltage transformer including a primary and four secondaries, with each secondary having substantially identical induced-voltage characteristics, a direct-current bias voltage source that is substantially balanced with respect to ground connected on one side to one of the ends of each of said first and fourth secondaries, with said ends having opposite-induced voltages, and connected on its other side to one of the ends of each of said second and third secondaries, with said ends having opposite-induced voltages, a pair of diodes serially connected with like-series polarity between the remaining ends of the first and second secondaries, said first pair of diodes normally biased below cutoff by said direct-current source, a second pair of diodes serially connected with like-series polarity between the remaining ends of the third and fourth secondaries, said second pair of diodes normally biased below cutoff by said direct-current source, second pair of diodes being connected with opposite polarity from said first pair of diodes with respect to the voltages induced in said secondaries, a signal transformer having a primary, and a secondary with a center tap, one end of said secondary connected serially to a point between said first pair of diodes, and the other end of said secondary serially connected to a point connected between said second pair of diodes, and the output of said comparator provided from the center tap of said secondary.

References Cited in the file of this patent

UNITED STATES PATENTS

| | | |
|---|---|---|
| 2,302,049 | Parker et al. | Nov. 17, 1942 |
| 2,695,988 | Gray | Nov. 30, 1954 |
| 2,700,763 | Foin | Jan. 25, 1955 |
| 2,708,718 | Weiss | May 17, 1955 |
| 2,774,932 | Patton | Dec. 18, 1956 |

FOREIGN PATENTS

| | | |
|---|---|---|
| 152,142 | Australia | July 2, 1953 |
| 544,406 | Great Britain | Apr. 13, 1942 |